US 6,711,263 B1

(12) United States Patent
Nordenstam et al.

(10) Patent No.: US 6,711,263 B1
(45) Date of Patent: Mar. 23, 2004

(54) SECURE DISTRIBUTION AND PROTECTION OF ENCRYPTION KEY INFORMATION

(75) Inventors: Jan Olof Nordenstam, Handen (SE); Allan Hansson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/544,892

(22) Filed: Apr. 7, 2000

(30) Foreign Application Priority Data

May 7, 1999 (SE) .............................................. 9901671

(51) Int. Cl.$^7$ ................................................ H04L 9/00
(52) U.S. Cl. ........................ 380/282; 380/278; 380/30; 713/156; 713/161; 713/169; 713/171
(58) Field of Search .......................... 380/30, 247, 279, 380/282; 713/156, 159, 155, 163, 167, 168, 169, 171, 141, 200; 340/5.22, 5.26, 5.74, 5.85; 705/52, 57, 56

(56) References Cited

U.S. PATENT DOCUMENTS

| | | | |
|---|---|---|---|
| 5,220,603 A | 6/1993 | Parker | 713/156 |
| 5,481,613 A * | 1/1996 | Ford et al. | 380/30 |
| 5,517,567 A | 5/1996 | Epstein | 380/247 |
| 5,563,950 A | 10/1996 | Easter et al. | 713/191 |
| 5,729,608 A | 3/1998 | Janson et al. | 713/171 |
| 5,781,723 A | 7/1998 | Yee et al. | 713/200 |
| 5,825,300 A | 10/1998 | Bathrick et al. | 340/5.74 |
| 6,253,193 B1 * | 6/2001 | Ginter et al. | 705/57 |

* cited by examiner

Primary Examiner—Emmanuel L. Moise (57) ABSTRACT

The invention relates to secure distribution of a private key from a distributing unit to a receiving unit, and is based on providing each of the distributing unit and the receiving unit with a protecting circuit holding an original private key unique for the protecting circuit. The protecting circuit of the receiving unit is associated with a certificate holding information on the type of the protecting circuit. The protecting circuit of the distributing unit requests this certificate to verify the authenticity by using a public key, of a certificate authority, stored in the protecting circuit. Next, the protecting circuit determines, based on the type information of the certificate, whether the protecting circuit of the receiving unit represents a type of circuit that is acceptable for protecting the private key to be distributed. If the protecting circuit is found to be acceptable, the private key is encrypted and transmitted thereto. The received key is decrypted and stored in the protecting circuit of the receiving unit. In this manner, the private key is protected during transfer and may be distributed to and securely protected in one or more receiving units.

22 Claims, 4 Drawing Sheets

SECURE DISTRIBUTION AND PROTECTION OF ENCRYPTION KEY INFORMATION

BACKGROUND

The present invention generally relates to applied cryptography, and more particularly to a method and system for secure distribution and protection of encryption key information.

Asymmetric cryptography, also referred to as public-key cryptography, makes use of two types of keys—public keys and private keys. Each communicating unit with asymmetric cryptography capabilities always has a pair of linked but separate keys, a public key and a private key. Information encrypted by one of the keys can only be decrypted by the other part of the key pair. The public key is normally made publically available for general use. The private key however should be kept private and not known to anybody, possibly except for the person to which it belongs.

Figure 1A:
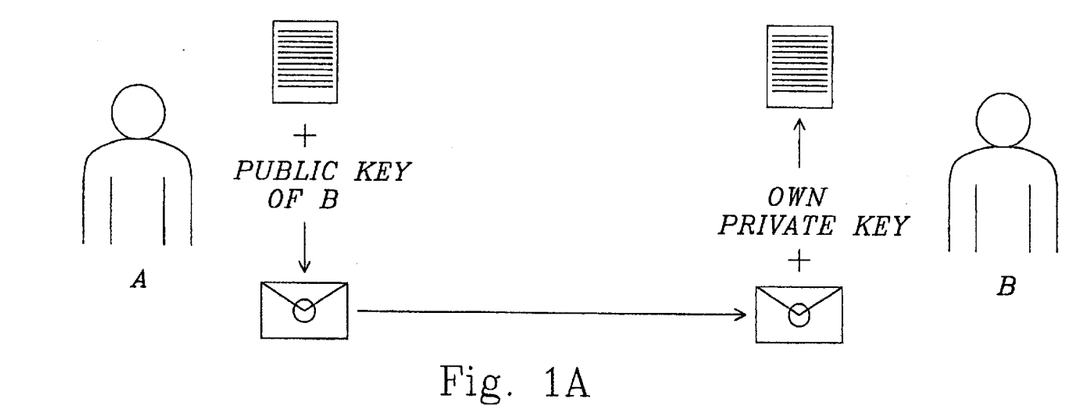
FIG. 1A is a schematic drawing illustrating the principles of sending a private message.
Figure 1B:
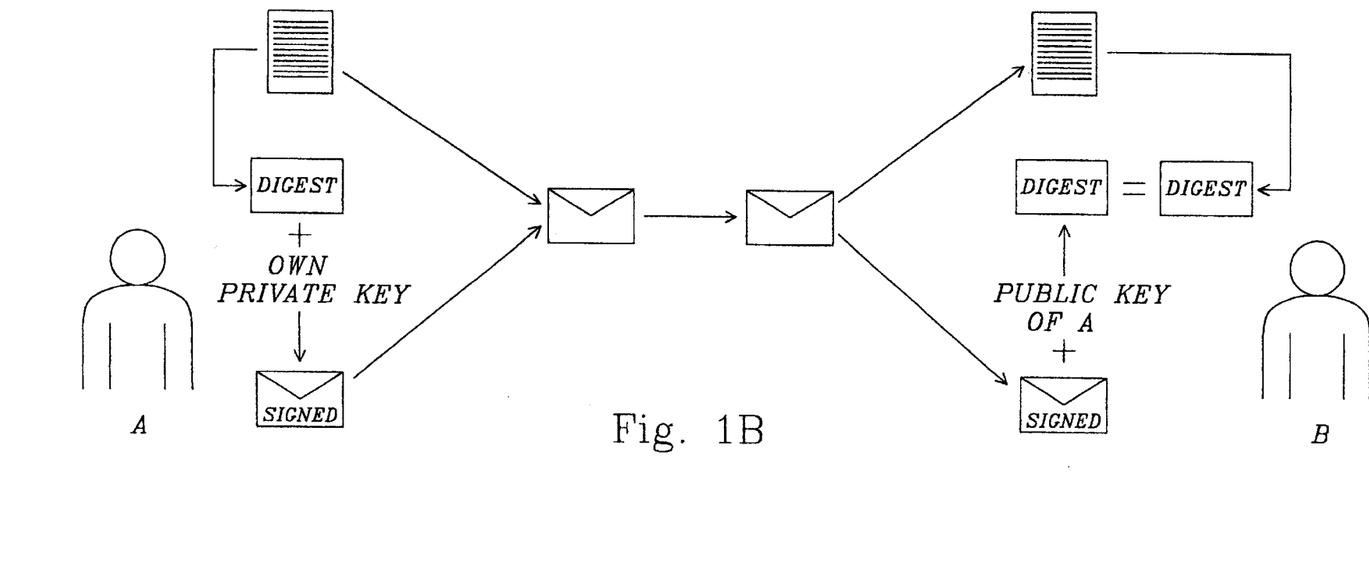
FIG. 1B is a schematic drawing illustrating the principles of sending a signed message.

In general, asymmetric cryptography is used in two ways, as illustrated in FIGS. 1A–B:

For sending private messages (FIG. 1A): If a message or a document is encrypted by the public key, it can only be decrypted by the private key. The sender can then be assured that only the intended receiver can decrypt the message. Hence the message will be private.

For signing messages (FIG. 1B): If a message or document is encrypted by the private key, it can only be decrypted by the public key. The receiver can then be assured that it is the alleged that actually sent the message. Hence, the private key acts as a digital signature. In general, a one-way message digest algorithm is applied to the message, and then the digest is encrypted and sent together with the original message. On the receiving side, the encrypted digest is decrypted by the corresponding public key, and the digest algorithm is applied to the original message and the results compared to verify authenticity.

Asymmetric cryptography allows any person to encrypt a message or a document and send it to another person without any prior exchange or agreement.

However, how can a person, business partner or merchant be sure that the public key of another person, merchant or partner is authentic? What if someone forges a message and also forges a public key to open that message? This problem is generally solved by the use of Certificate Authorities. A Certificate Authority (CA), which is a trusted organization, verifies the credentials of people and puts its "stamp" of approval on those credentials by issuing so-called digital certificates. A digital certificate, hereinafter simply referred to as a certificate, verifies the authenticity of a user and certifies that a certain public key belongs to a certain individual. Normally, a certificate comprises a set of information concerning the approved individual, the public key of this individual, and possibly a set of information concerning the issuer of the certificate. In general, a message digest algorithm is applied to this information, and the digest is then encrypted by the private key of the CA. In a more general sense, the certificate can be seen as a container for a public key and information on the individual to which the public key is given. The container is then signed with the digital signature of the trusted CA.

A receiver of a certificate can then decrypt the digital signature by using the public key of the CA, apply the message digest algorithm to the original certificate and compare the results to verify that the certificate is authentic. This of course assumes that the CA is indeed trusted. In the United States, a hierarchy of trusted organizations is being formed, where private and local organizations are authorized by national CAs.

The asymmetric cryptography scheme together with digital certificates is well suited for electronic commerce, on-line business transactions and secure logon to servers, and is regarded by many as a key factor to secure and flexible communication over digital networks.

Asymmetric or public-key cryptography as such is well-known in the art, originally developed already in the mid 1970s by Diffie and Hellman, and later turned into the effective and usable RSA system developed by Rivest, Shamir and Adelman.

The problem area is the distribution of encryption key information such as private keys to different systems and units and storage of the keys in the units. An individual may have several communicating units, such as mobile telephones, personal computers and personal digital assistants. It is desirable, for convenience and flexibility, that the individual can use the same private key and the same certificate, independent of the unit by which the individual is communicating. Is it possible to securely distribute a private key to one or more distributed units and keep it there in a secure manner?

Usually, the key as well as the encryption algorithm are stored as software in each communicating unit. However, the main disadvantage with this method is that there is no secure way to store sensitive information in software other than what is provided for storing data in an ordinary PC or equivalent. This means that the private key may be illegitimately accessed rather easily by a person other than the key holder. In addition, there is no simple and secure way to distribute the key to other units.

Protecting circuits, sometimes referred to as tamper-resistant hardware modules, have been used to secure private keys, for example as described in U.S. Pat. No. 5,563,950. A protecting circuit is a physically and logically encapsulated circuit. For example, a protecting circuit could be in the form of an encapsulated integrated circuit having a restricted interface and equipped with non-erasable logic and a permanent memory for storing non-erasable sensitive information. An essential characteristic is that at least a subset of the logic and the stored information is not available or visible outside of the circuit. By encapsulating at least the cryptographic engine and the private key in such hardware, it is impossible to read the key from the outside. An individual may then use the circuit and the private key encapsulated therein for cryptography. The whole encapsulated system may receive information and encrypt it with the key, or receive encrypted information and decrypt it with the key. However, this method is inflexible. An individual who owns several communicating units is required to hold as many certificates and private keys. Furthermore, if the private key is to be replaced by a new key (it is strongly recommendable to replace the private key on a regular basis), the entire unit has to be changed.

Still another known solution is to use a tamper-resistant smart card provided with a private key. This means that each unit has to be equipped with a card reader. Although smart cards offer many advantages, smart cards are also quite inconvenient. Each time asymmetric cryptography is required, the smart card has to be inserted into the card reader. In addition, if another card, e.g. an ordinary credit card, is to be used for a transaction that requires encryption, yet another card reader is required. The need for additional card readers is of course a restriction, and leads to heavier, bigger and more expensive communicating units than would have been possible otherwise. For mobile telephones, personal digital assistants and portable computers where the trend is towards smaller and smaller units, the need for a card reader becomes a problem.

The present invention overcomes these and other drawbacks of the prior art.

U.S. Pat. No. 5,517,567 relates to the distribution of a communications key from a master unit to a remote unit, and employs first and second secret numbers, a random number, and first and second intermediate numbers generated from the secret numbers and the random number. The second intermediate number is combined with the key to generate a transmission number that is sent together with the random number from the master unit to the remote unit. The remote unit is able to reproduce the key by using the random number, the transmission number and the first and second secret numbers. Each one of the master and remote units includes XOR-circuitry for exclusive OR-ing of the random number and the first secret number to generate the first intermediate number, as well as a conventional DES (symmetric) encryption unit for encrypting the first intermediate number by the second secret number to generate the second intermediate number.

U.S. Pat. No. 5,825,300 relates to a method of protected distribution of keying and certificate material between a Certificate Authority (CA) and an entity within the domain thereof. First, the CA sends keying material, including a password, to the entity via a first secure medium such as manual courier or secure mail. The receiving entity generates a public and private key pair using the keying material, and generates and protects a request for a certificate to the CA by using the keying material. The request is sent to the CA via a second secure medium, and the CA authenticates the identity of the requesting entity by requesting the public key and the address of the requesting entity, the requesting entity protects the transmission of its public key and address to the CA by using the keying material. Once the identity of the requesting entity is confirmed, the CA issues the certificate and records the public key at the CA for public use.

U.S. Pat. No. 5,781,723 relates to a system and method for self-identifying a portable information device to a computing unit. A device class tag indicative of the type of the portable information device is permanently embedded in the device. When communication is established between the portable information device and the computing unit of a Certificate Authority (CA), the portable information device sends a certificate request including the results of a mathematical operation involving the device class tag to the computing unit. The mathematical operation renders it computationally difficult or infeasible to deduce the device class tag from the result so that the device class tag is not exposed from the portable information device. The computing unit uses the tag-related portion of the message to identify the type of the portable information device, and issues a certificate confirming the identity and type of the portable information device. During subsequent transactions, the certificate can be used by the portable information device for self-identification purposes.

SUMMARY

It is a general object of the present invention to provide secure distribution of encryption key information, such as a private key, from a distributing unit to a receiving unit, as well as secure protection of the private key therein.

In particular, it is an object of the invention to provide a key distributing system and a method for protected distribution of encryption key information.

Still another object of the invention is to facilitate replacement of a private key.

These and other objects are met by the invention as defined by the accompanying patent claims.

The present invention is based on providing each of the distributing unit and the receiving unit with a protecting circuit that holds an original private key unique for the protecting circuit. The protecting circuit of the receiving unit is associated with a certificate that holds information on the type of the protecting circuit. The protecting circuit of the distributing unit requests the certificate of the receiving unit and verifies the authenticity by using a public key, of a trusted CA, stored in the protecting circuit of the distributing unit. Next, the protecting circuit of the distributing unit determines, based on the type information of the certificate, whether the protecting circuit of the receiving unit represents a type of circuit that is acceptable for protecting the encryption key information to be distributed. If the receiving unit's protecting circuit is found to be acceptable, the encryption key information is encrypted and transmitted thereto. The received encryption key information is decrypted and stored in the protecting circuit of the receiving unit. In this manner, encryption key information, such as a private key of an individual person, is protected during transfer and may be distributed to and securely protected in one or more receiving units.

Naturally, the encryption key information is encrypted by the public key of receiving unit's protecting circuit, and the encrypted encryption key information is decrypted by the private key of the receiving unit's protecting circuit.

Furthermore, the protecting circuit of the receiving unit is preferably configured to delete the encryption key information (K) received and protected therein if it receives an authenticated delete request from the unit that distributed the encryption key information. In this way, the encapsulated key can be destroyed by the owner of the device upon an authenticated delete request, and a new key can be installed by repeating the above distribution procedure, either by the same individual or by a new owner. Instead of changing the entire device as in the prior art, the key can be securely replaced in an efficient manner.

The invention offers the following advantages:

Encryption key information is protected during transfer and may be distributed to and securely protected in one or more receiving units; and The encapsulated key can be destroyed by the owner of the device, and replaced by a new key.

Other advantages offered by the present invention will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION

Throughout the drawings, the same reference characters will be used for corresponding or similar elements.

Figure 2:
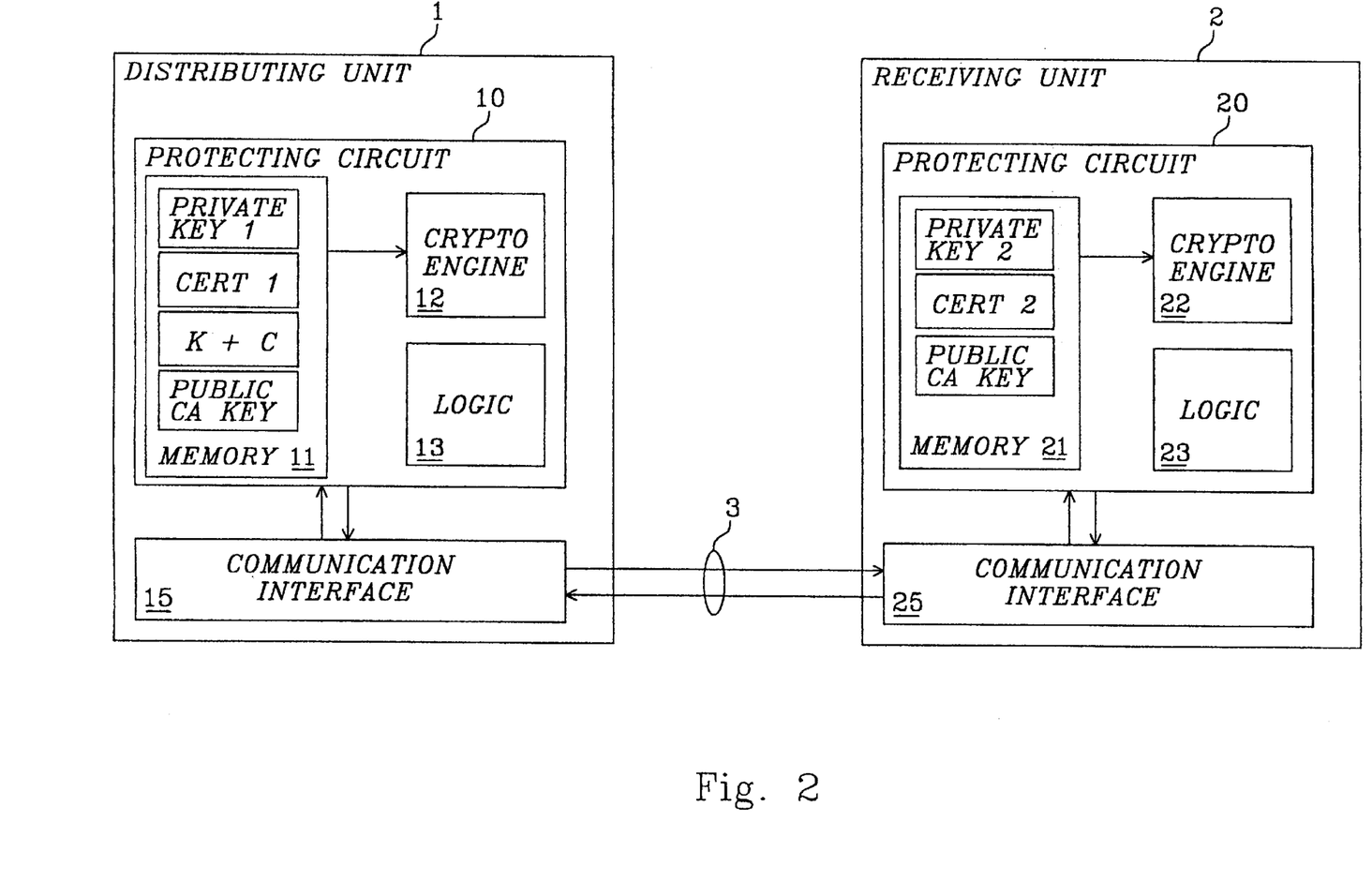
FIG. 2 is a schematic diagram of pertinent parts of a key distributing system according to the invention.

FIG. 2 is a schematic diagram of pertinent parts of a key distributing system according to the invention. The system basically comprises a distributing unit 1 and a receiving unit 2 interconnected by a communication link 3.

The distributing unit 1 comprises a protecting circuit 10 in which a persistent memory 11, a cryptographic engine 12 and logic 13 are incorporated. Preferably, the protecting circuit 10 is in the form of an encapsulated integrated circuit having a restricted interface. This means that the persistent memory 11, the cryptographic engine and the logic 13 are physically and logically encapsulated, thus providing a high degree of protection of the information stored and/or processed within the protecting circuit 10. The memory 11 holds a first private key that is unique for the protecting circuit 10, and encryption key information K to be distributed to the receiving unit 2.

The encryption key information K stored in the persistent memory 11 of the protecting circuit 10 generally includes a private key of an individual person, possibly together with additional information. When the encryption key information K is in the form of a private key, a certificate C associated with the private key is normally stored together with the key in the memory 11.

Preferably, the protecting circuit 10 is associated with a certificate CERT 1, which holds the public key of the circuit, information on the circuit, such as the identity and type of the circuit, and possibly information on the issuer of the certificate. The certificate is generally signed by the issuing Certificate Authority, and therefore the certificate does not necessarily have to be stored in the protecting circuit, but may be stored in an additional memory provided outside of the protecting circuit 10. However, for reasons of convenience, the certificate CERT 1 is preferably stored in the persistent memory 11.

Further, the public key of a trusted CA, such as the CA issuing the certificate CERT 1 or possibly a more central CA, has to be stored in the protecting circuit 10. The public key of such a CA is used for verification of the certificates of other circuits, either directly or in steps. It is assumed that a requested certificate holds some information on the issuer of the certificate.

In the former case, it is also possible to store the public keys of a number of different CAs to facilitate the verification of the certificates of other circuits.

In the latter case, the public key stored in the protecting circuit 10 is used for successively deducing a public key of another CA in a hierarchy of CAs. For example, the successive deduction may be performed in a central server of the trusted CA. After processing in the central server, a signed message is sent by the trusted CA to the distributing unit 1 to inform whether the other CA belongs to a hierarchy of trusted CAs, the corresponding public key also being sent in the signed message.

Alternatively, if the requested certificate is sent together with the public key of the CA that issued the requested certificate instead of just the name of the issuing CA, the public key stored in the protecting circuit 10 may simply be used for verifying that the CA is trusted or belongs to a hierarchy of trusted CAs. The public key of the issuer of the requested certificate may then be used to verify that the requested certificate is authentic.

Similarly, the receiving unit 2 comprises a protecting circuit 20 in which a persistent memory 21, a cryptographic engine 22 and logic 23 are incorporated. The persistent memory 21 holds a second private key that is unique for the protecting circuit 20. In the same manner as for the protecting circuit 10, the protecting circuit 20 provides a high degree of protection for the information stored and/or processed within the protecting circuit. The protecting circuit 20 is associated with a certificate CERT 2, which holds the public key of the circuit, information on the circuit, such as the identity (a serial number) and type of the circuit, and possibly information on the issuer of the certificate. Preferably, although not necessarily, the certificate CERT 2 is also stored in the persistent memory 21. Further, the protecting circuit 20 preferably holds a public key of a trusted CA for verification of certificates of other circuits.

Although not explicitly illustrated, it should be understood that the units 1, 2 may include additional processing capabilities, common memories, conventional interfaces for input/output of data and user interfaces if necessary for the auxiliary functions of these units.

Examples of the distributing and receiving units 1, 2 are personal computers, mobile telephones, personal digital assistants, palmtops, smart cards, key generators, set top boxes, even devices in vehicles such as cars and motorcycles.

Examples of the communication link 3 are conventional communication busses, radio links, infrared links, wireless LAN links such as Bluetooth, links over public networks such as the so-called Internet, or combinations thereof, depending on the characteristics of the distributing and receiving units 1, 2.

In operation, the distributing unit 1 requests the certificate of the protecting circuit 20 of the receiving unit 2, preferably by transmitting a certificate request from the protected logic 13 to the receiving unit 2 via the communication interface 15, the communication link 3 and the communication interface 25. The receiving unit 2 responds by transmitting the certificate CERT 2 to the distributing unit 1 via the communication interface 25, the communication link 3 and the communication interface 15. It is assumed that the distributing unit 1 and the receiving unit 2 use a common protocol for communication. The transmitted certificate CERT 2 is then transferred from the communication interface 15 to the protected logic 13, which evaluates the certificate.

The requested certificate CERT 2 is preferably stored in the persistent memory 11 or in a common memory in the distributing unit 1 for encryption as well as recording purposes.

Although the certificate request may be initiated anywhere in the distributing unit 1, it should be understood that the requested certificate eventually is transferred to the logic 13 of the protecting circuit 10 for protected evaluation therein.

Preferably, the logic 13 and 23 are implemented as programmable logic.

First, the protected logic 13 has to verify that the requested certificate CERT 2 is authentic. This is handled by using the public key, of the trusted CA, stored in the persistent memory 11 of the protecting circuit 10. If the requested certificate is issued by the same CA that certified the protecting circuit 10, the verification is quite straightforward, and the certificate is authenticated by using the public key of the CA. However, if the requested certificate is issued by another CA, belonging to a common hierarchy of CAs, the public CA key stored in the protecting circuit 10 has to be used in a successive procedure to deduce the public key of the relevant CA. Subsequently, the deduced public key can be used in a conventional manner to verify that the certificate is authentic.

Alternatively, if the requested certificate CERT 2 is sent together with the public key of the issuer of the certificate, the public key stored in the protecting circuit 10 may simply be used for verifying that the issuer of the certificate CERT 2 is trusted or belongs to a hierarchy of trusted CAs. The public key of the issuer of the certificate CERT 2 may then be used to verify that the requested certificate is authentic.

Provided the requested certificate CERT 2 is verified as authentic, the protected logic 13 determines, based on type information of the requested certificate CERT 2, whether the protecting circuit 20 represents a type of circuit that is acceptable for protecting the encryption key information K.

The distributing unit 1 needs to know that the receiving unit 2 can handle the encryption key information in a secure manner before it distributes the encryption key information. In general, there are units of different types with varying degree of protection of sensitive information. First of all, there may be units without protecting circuits. Normally, such units are not acceptable. Then there may be units with different types of protecting circuits operating at different security levels with varying restrictions concerning the input/output interface of the protecting circuit.

A number of predetermined types of key receiving circuits may be accepted by the protected logic 13, and information on the accepted types of circuits is preferably held in a table that can be accessed by the logic 13 for comparison with the type information of the requested certificate. Assume by way of example that type A circuits and type B circuits are accepted, a type A circuit being a protecting circuit encapsulated according to a first predefined standard, and a type B circuit being a protecting circuit encapsulated according to a second predefined standard. Further, it may be assumed that a type A circuit holds the distributed key strictly within the protecting circuit, whereas a type B circuit is allowed to distribute the key to type A circuits in response to an authenticated command from the unit that distributed the key in the first place. Thus, if the type information of the requested certificate CERT 2 of the receiving unit's protecting circuit matches type A or type B, the circuit is accepted. However, if by way of example, the receiving unit's protecting circuit is encapsulated according to a standard other than those specified for type A and type B circuits, the circuit will not be accepted. Similarly, a circuit type that is allowed to distribute the key to other units unconditionally will not be accepted.

A common requirement on the protecting circuit of the receiving unit is that the encryption key information is strictly held within the protecting circuit. Thus, the encryption key information K distributed to the receiving unit can not normally be distributed to a further unit. Alternatively, the protecting circuit of the receiving unit is allowed to distribute the encryption key information to a further unit, but only under very strict conditions.

Accordingly, for each distributing unit, the protected logic has to make sure that the circuit to which the encryption key information is to be distributed has a number of predetermined properties or follows a number of predetermined rules with regard to the protection of the private key.

Further, it has turned out to be advantageous to provide the protecting circuit 20 of the receiving unit 2 with an expiry date. In order to evaluate the expiry date without synchronized clocks, the creation date of the certificate C associated with the private key K to be distributed is compared to the expiry date. If the creation date lies after the expiry date, the protecting circuit 20 of the receiving unit is deemed to have expired and the key distribution process is terminated.

If the protecting circuit 20 of the receiving unit 2 is determined to be acceptable, the cryptographic engine 12 encrypts the encryption key information K by the public key of the receiving unit's protecting circuit 20. The public key is obtained from the certificate CERT 2 stored in the distributing unit 1. After encryption, the encrypted encryption key information K is transferred from the cryptographic engine 12 to the communication interface 15, and transmitted via the link 3 to the communication interface 25 of the receiving unit 2. In the receiving unit 2, the encrypted encryption key information K is transferred from the communication interface 25 to the cryptographic engine 22, in which it is decrypted by the private key of the protecting circuit 20. The decrypted encryption key information K is then ready to be stored in the persistent memory 21 of the protecting circuit 20.

In this manner, the encryption key information K is protected during transfer and securely protected in the protecting circuit of the receiving unit 2. The embedded and protected encryption system of the receiving unit can then be used by any application that requires secure transfer of information.

It should be understood that each one of the cryptographic engines 12 and 22 includes an asymmetric cryptographic unit, for example of RSA-type.

When the encryption key information K is in the form of a private key, the certificate associated with that private key is normally transferred to the protecting circuit 20 of the receiving unit 2.

For additional security, a PIN-code or a biometric code such as a digital fingerprint may be required to start the key distribution procedure. For even further security, a PIN-code or biometric code for the receiving side may be requested and checked by the distributing side. Such codes are preferably stored in the protecting circuits.

When the key eventually has been distributed, a key number may indicate which key that was distributed, and the certificate CERT 2 stored in the memory 11 of the protecting circuit 10 indicates to which circuit the key was distributed.

Preferably, two-way encryption is used as yet another security measure. This generally means that the encryption key information K encrypted by the public key of the protecting circuit 20 is also "signed" by the private key of the protecting circuit 10. The encrypted encryption key information K is then two-way decrypted by the public key of the protecting circuit 10 as well as the private key of the protecting circuit 20. However, this requires that the protecting unit 20 requests the certificate CERT 1 of the protecting circuit 10, and that the public CA key stored in the protecting circuit 20 is used for verification of the authenticity of the certificate CERT 1, and the public key comprised therein, of the protecting circuit 10.

The certificate CERT 1 of the protecting circuit certifies that circuit 10 is of a type that is allowed to distribute the encryption key information K, encrypted in predetermined manner, to a receiving unit equipped with a protecting circuit of a predetermined type, and the certificate CERT 2 of the protecting circuit 20 certifies that circuit 20 is of a type that is accepted by the protecting circuit 10.

Normally, the requested certificate CERT 1 of the first protecting circuit 10 is stored in the persistent memory 21 of the protecting circuit 20. Accordingly, the receiving unit 2 generally holds the public key of the protecting circuit 10 of the distributing unit 1 and information on the identity and the type of the protecting circuit 10, possibly together with a key number associated with the distributed private key.

In the case of two-way encryption when the certificate CERT 1 of the first protecting circuit 10 has been stored in the second protecting circuit 20, the protecting circuit 20 of the receiving unit 2 may be configured to delete the encryption key information K received and protected therein if it receives an delete request from the same unit that distributed the encryption key information in the first place. In order to allow authentication of the delete request, the protecting circuit 10 of the distributing unit 1 signs the request, and then transmits it to the receiving unit 2. The authenticity of the delete request is evaluated in the protected logic 23 by using the public key comprised in the stored certificate CERT 1. The encryption key information K is deleted from the memory 21 if it can be verified that the delete request is authentic. In this way, the encapsulated key can be destroyed by the owner of the device in response to an authenticated delete request, and a new key can be installed by repeating the above distribution procedure, either by the same individual or by a new owner. Instead of changing the entire device as in the prior art, the key can be securely replaced in an efficient manner.

Although the encryption key information K normally includes a private key, an alternative approach is to provide the protecting circuit 20 of the receiving unit 2 with a conventional key generator (not shown), and transfer a parameter representation of the private key, protected in the same manner as described above, to the receiving unit. The parameter representation is forwarded to the key generator which subsequently generates the private key.

Still another alternative approach includes the use of symmetric cryptography. In this case, the distributed encryption key information K comprises a symmetric encryption key, and each one of the cryptographic engines 12 and 22 further comprises a symmetric cryptographic unit (not shown), for example of DES-type. The symmetric encryption key distributed form the protecting circuit 10 to the protecting circuit 20 and stored therein, is subsequently used for encrypting the private key to be distributed to the receiving unit. Once encrypted by the symmetric key in the DES-type unit of the cryptographic engine 12, the private key is transmitted to the receiving unit 2, and decrypted in the DES-type unit of the cryptographic engine 22 by use of the previously distributed symmetric key. The decrypted private key is subsequently stored in the memory 21 of the protecting circuit 20. It should be understood that the symmetric key does not have to be pre-stored in the protecting circuit of the distributing unit, but may be generated on a per-session basis.

For a better understanding of the invention, a specific example of a key distributing system will now be described with reference to FIG. 3.

Figure 3:
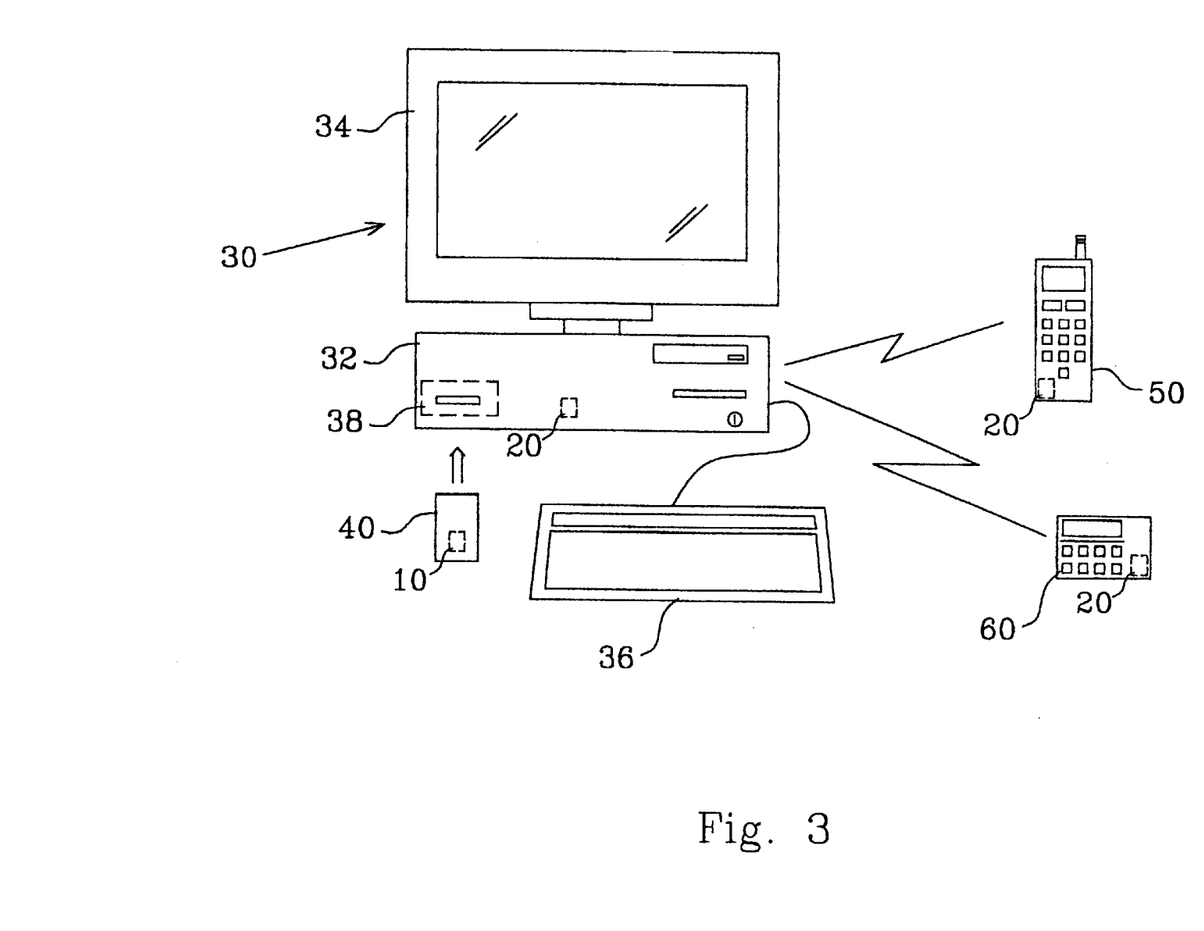
FIG. 3 is a schematic diagram illustrating a specific example of a system having a key distributing unit and a number of interconnected key receiving units, according to the invention.

FIG. 3 is a schematic diagram illustrating a specific example of a system having a key distributing unit and a number of interconnected key receiving units, according to the invention. The system basically comprises a personal computer 30 or equivalent, a smart card 40, a mobile telephone 50 and a personal assistant 60. The personal computer (PC) 30 is any conventional personal computer system having a central processing unit (CPU) 32, a display 34, a keyboard 36 and a card reader unit 38 for interfacing a smart card 40.

According to the invention, the smart card 40 is provided with a protecting circuit 10 as described above, and each one of the PC 30, mobile telephone 50, and PDA 60 is provided with a protecting circuit 20 as described above in connection with FIG. 2. The protecting circuit 10 holds a private key unique for the circuit, a public key of a trusted CA, as well as a private key K to be distributed to at least one of the PC 30, the mobile 50 and the PDA 60. The protecting circuit 20 in each one of the devices holds a private key unique for the circuit, and is of a type that is acceptable, as determined by logic in the protecting circuit 10, for protecting the private key K to be distributed.

As mentioned, it is assumed that the private key K is encapsulated on the smart card 40. The smart card can communicate with any device provided a link can be established between them. In operation, the smart card 40 is inserted to the card reader 38 of the PC system 30, and the required communication is performed using the communication bus of the PC. Once, the protecting circuit 20 of the PC 30 is accepted, the private key K is encrypted in the protecting circuit 10 and transferred to the protecting circuit 20 of the PC 30 via the card reader 38 and the communication bus of the PC. The transferred key K is then decrypted and stored in the protecting circuit 20. The mobile telephone 50 and the PDA 60 are preferably connected to the PC 30 by means of a wireless LAN technique (infrared or radio). This means that the PC 30, the mobile 50 and the PDA 60 are all equipped with circuitry, preferably standard Bluetooth circuits, for establishing connections within a wireless LAN. Preferably, the private key K is distributed from the smart card 40 to the mobile 50 and/or PDA 60 via the PC system 30, using the card reader 38, the communication bus of the PC system 30 and the LAN circuits of the PC 30 as well as of the mobile 50 and the PDA 60.

Since the private key K is encrypted, any conventional communication link between the key distributing unit (smart card 40) and the key receiving unit (PC 30, mobile 50, PDA 60) can be used.

The private key K encapsulated on the smart card 40 can be transferred by a key generator (not shown) to the smart card 40 by the same procedure as described in connection with FIG. 2. Hence, the key distribution procedure may be repeated in a recursive manner in several stages, where a unit that had a key receiving role in a first stage assumes, under certain circumstances, a key distributing role in the next stage.

Figure 4:
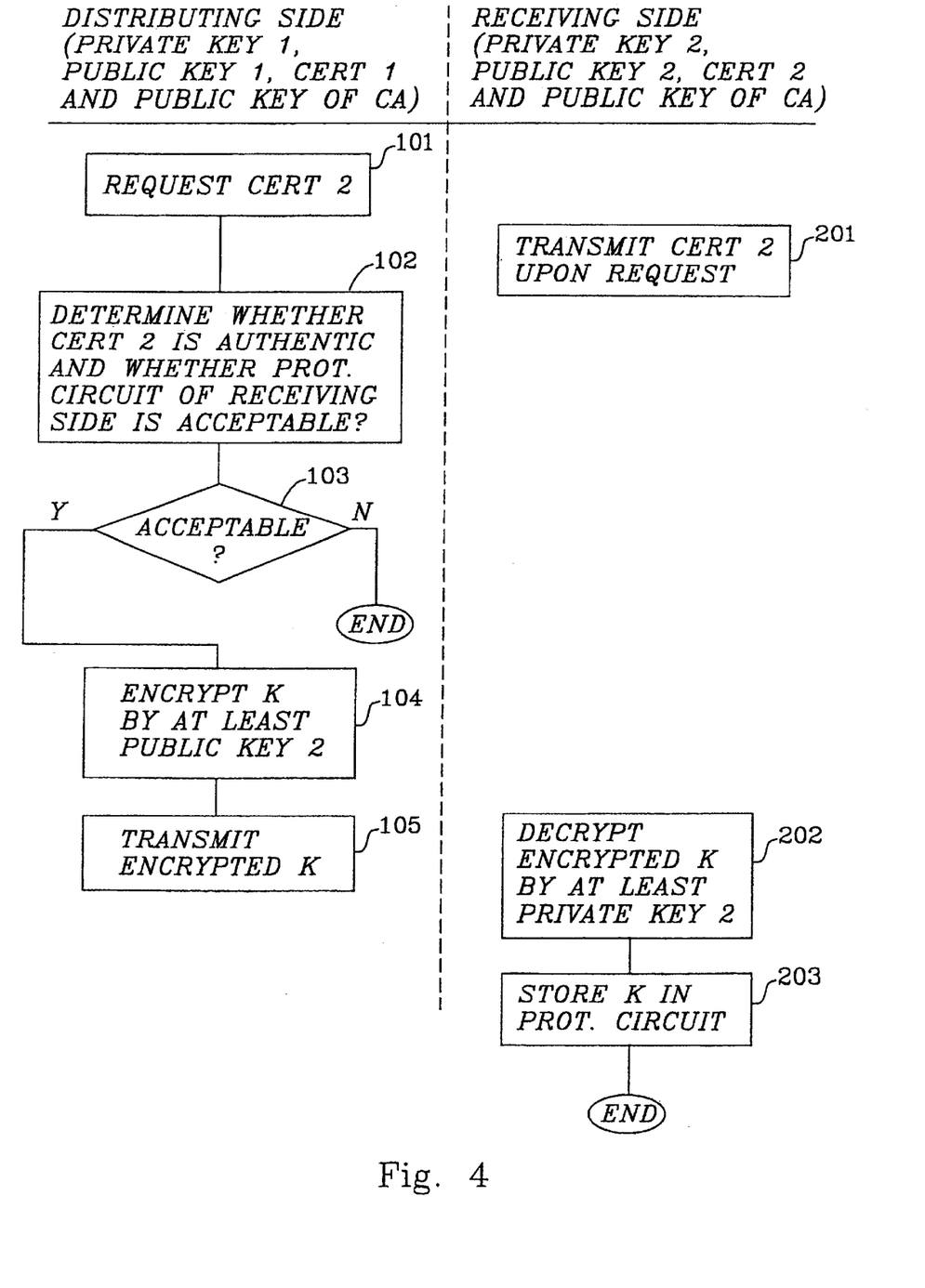
FIG. 4 is a schematic flow diagram of a method for protected distribution of encryption key information according to the invention.

FIG. 4 is a schematic flow diagram of a method for protected distribution of encryption key information according to the invention. The encryption key information K is to be distributed from a distributing side to a receiving side. The distributing side has a protecting circuit with a private key 1, a public key 1, a certificate CERT 1 and a public key of a trusted CA. The receiving side has a protecting circuit with a private key 2, a public key 2, a certificate CERT 2, and a public key of a trusted CA (not necessarily the same CA as for the distributing side). In step 101, the distributing side requests the certificate CERT 2 of the protecting circuit of the receiving side. The receiving side transmits the certificate CERT 2 of its protecting circuit upon request, in step 201. In step 102 and 103, the distributing side verifies the authenticity and determines whether the protecting circuit of the receiving side is of a type that is acceptable for protecting the encryption key information based on information on the circuit type comprised in the requested certificate CERT 2. If not acceptable, the encryption key information K will not be distributed. If acceptable, the encryption key information K is encrypted by at least the public key 2 of the protecting circuit of the receiving side, in step 104. In step 105, the encrypted key information K is transmitted to the receiving side. On the receiving side, the encrypted key information K is decrypted by at least the private key 2 of the protecting circuit of the receiving side, in step 202. Finally, in step 203, the decrypted encryption key information K is stored in the protecting circuit at the receiving side.

The embodiments described above are merely given as examples, and it should be understood that the present invention is not limited thereto. Further modifications, changes and improvements which retain the basic underlying principles disclosed and claimed herein are within the scope of the invention.

What is claimed is:

1. A key distributing system comprising a distributing unit and a receiving unit interconnected by a communication link, said distributing unit having encryption key information to be distributed to said receiving unit, wherein:
    said distributing unit includes a first protecting circuit holding a public key of a trusted certificate authority;
    said receiving unit includes a second protecting circuit holding an original private key unique for said second protecting circuit, said second protecting circuit being associated with a certificate that includes information on the type of said second protecting circuit;
    wherein said first protecting circuit includes:
        means for requesting the certificate of said second protecting circuit;
        means for determining, by means of the public key of said certificate authority, whether the requested certificate is authentic;
        means for determining based on the type information of said certificate whether said second protecting circuit represents one of a number of predetermined types of circuits that are acceptable for protecting said encryption key information, provided said certificate is determined to be authentic;
        means for encrypting said encryption key information provided said second protecting circuit is determined to be acceptable; and
        means for transmitting said encrypted encryption key information to said second protecting circuit via said communication link; and
    wherein said second protecting circuit includes:
        means for decrypting said encrypted encryption key information; and
        means for storing said encryption key information.

2. A key distribution system according to claim 1, wherein:
    said encrypting means encrypts said encryption key information by the public key comprised in the requested certificate of said second protecting circuit, and said decrypting means decrypts said encrypted encryption key information by the private key of said second protecting circuit.

3. A key distribution system according to claim 1, wherein:
    said first protecting circuit holds an original private key unique for said first protecting circuit, and is associated with a certificate that includes a public key of said first protecting circuit;
    said second protecting circuit comprises means for requesting the certificate of said first protecting circuit and further holds a public key of a trusted certificate authority for verifying that the requested certificate is authentic;
    said encrypting means two-way encrypts said encryption key information by the public key comprised in the requested certificate of said second protecting circuit and the private key of said first protecting circuit; and
    said decrypting means two-way decrypts said encrypted encryption key information by the public key comprised in the requested certificate of said first protecting circuit and the private key of said second protecting circuit.

4. A key distribution system according to claim 3, wherein said second protecting circuit further comprises:
    means for storing the certificate of said first protecting circuit provided the certificate is verified as authentic; and
    means for deleting the encryption key information stored therein in response to a delete request signed by the private key of the first protecting circuit, said delete request being authenticated by means of the public key comprised in the stored certificate.

5. A key distribution system according to claim 1, wherein:
    said encryption key information comprises a private key or a representation thereof.

6. A key distribution system according to claim 5, wherein:
    a certificate associated with said private key is transferred from said distributing unit to said receiving unit.

7. A key distribution system according to claim 1, wherein:
    each one of said acceptable types of circuits handles said encryption key according to a number of predetermined rules.

8. A key distribution system according to claim 1, wherein:
    an acceptable type of circuit holds said encryption key information within the protecting circuit.

9. A key distribution system according to claim 8, wherein:
    an acceptable type of circuit further deletes the encryption key information stored therein if it receives a delete request from the unit that distributed the encryption key information.

10. A key distribution system according to claim 1, wherein:
    said encryption key information comprises a symmetric key;
    said first protecting circuit includes:
        means for encrypting a private key by said symmetric key;
        means for transmitting said symmetrically encrypted private key to said second protecting circuit; and
    said second protecting circuit includes:
        means for decrypting said symmetrically encrypted private key by said symmetric key; and
        means for storing said private key.

11. A key distribution system according to claim 1, wherein:
    said first protecting circuit has an engine for asymmetric cryptography and a persistent memory for storing the encryption key information to be distributed, the public key of said trusted certificate authority, as well as an original private key unique for said first protecting circuit.

12. A key distribution system according to claim 1, wherein:
said second protecting circuit has an engine for asymmetric cryptography and a persistent memory for storing the private key of said second protecting circuit, the received encryption key information, as well as a public key of a trusted certificate authority.

13. A key distribution system according to claim 1, wherein:
the requested certificate of said second protecting circuit is stored in said key distributing unit.

14. A key distribution system according to claim 1, wherein:
the certificate of said second protecting circuit has information on the identity of the second protecting circuit, and said key distributing unit stores the identity of said second protecting circuit.

15. A method for protected distribution of encryption key information from a key distributing unit to a key receiving unit via a communication link, comprising the steps of:
providing said distributing unit with a first protecting circuit holding a public key of a trusted certificate authority;
providing said receiving unit with a second protecting circuit holding an original private key unique for said second protecting circuit;
associating said second protecting circuit of said receiving unit with a certificate having information on the type of said second protecting circuit;
said first protecting circuit requesting the certificate of said second protecting circuit, and determining, by using the public key of said certificate authority, whether the requested certificate is authentic, and determining, based on the type information of said certificate, whether said second protecting circuit represents a type of circuit that is acceptable for protecting said encryption key information; and
provided said requested certificate is determined to be authentic and said second protecting circuit is determined to be acceptable, then:
encrypting said encryption key information in said first protecting circuit;
transmitting said encrypted encryption key information from said first protecting circuit to said second protecting circuit via said communication link;
decrypting said encrypted encryption key information in said second protecting circuit; and
storing said encryption key information in said second protecting circuit.

16. A method according to claim 15, wherein;
said encryption key information is encrypted by the public key comprised in the requested certificate of said second protecting circuit, and said encrypted encryption key information is decrypted by the private key of said second protecting circuit.

17. A method according to claim 15, wherein:
said first protecting circuit holds an original private key unique for said first protecting circuit, and is associated with a certificate that includes a public key of said first protecting circuit;
said second protecting circuit requests the certificate of said first protecting circuit, and further holds a public key of a trusted certificate authority for verifying that the requested certificate is authentic;
said encryption key information is two-way encrypted by the public key comprised in the certificate of said second protecting circuit and the private key of said first protecting circuit; and
said encrypted encryption key information is two-way decrypted by the public key comprised in the certificate of said first protecting circuit and the private key of said second protecting circuit.

18. A method according to claim 17, wherein:
said second protecting circuit-stores the certificate of said first protecting circuit provided the certificate is verified as authentic, and deletes the encryption key information stored therein in response to a delete request signed by the private key of said first protecting circuit, said delete request being authenticated by means of the public key comprised in the stored certificate.

19. A method according to claim 15, wherein:
said encryption key information comprises a private key or a representation thereof.

20. A method according to claim 15, wherein:
an acceptable type of circuit handles said encryption key according to a number of predetermined rules.

21. A method according to claim 15, wherein:
an acceptable type of circuit holds said encryption key information within the protecting circuit.

22. A method according to claim 15, wherein:
said encryption key information comprises a symmetric encryption key, which is subsequently used for securely distributing a private asymmetric encryption key from said first protecting circuit to said second protecting circuit.

* * * * *